United States Patent
Hanko et al.

(10) Patent No.: US 6,493,041 B1
(45) Date of Patent: Dec. 10, 2002

(54) METHOD AND APPARATUS FOR THE DETECTION OF MOTION IN VIDEO

(75) Inventors: James G. Hanko, Redwood City, CA (US); J. Duane Northcutt, Menlo Park, CA (US); Gerard A. Wall, San Jose, CA (US); Lawrence L. Butcher, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/108,066

(22) Filed: Jun. 30, 1998

(51) Int. Cl.[7] .................................................. H04N 7/18
(52) U.S. Cl. ........................ 348/699; 348/169; 348/170; 375/240.17
(58) Field of Search ................................ 348/169, 170, 348/143, 153, 154, 155; 375/240.06, 240.16, 240.17

(56) References Cited

U.S. PATENT DOCUMENTS

| 4,661,853 A |   | 4/1987  | Roeder et al. |          |
|-------------|---|---------|---------------|----------|
| 5,627,905 A | * | 5/1997  | Sebok et al.  | 348/416.1|
| 5,731,832 A |   | 3/1998  | Ng            |          |
| 5,973,738 A | * | 10/1999 | Srivastava    | 348/395.1|
| 6,035,067 A | * | 3/2000  | Ponticos      | 382/226  |
| 6,061,088 A | * | 5/2000  | Khosravi et al.| 348/169 |
| 6,091,777 A | * | 7/2000  | Guetz et al.  | 375/240  |
| 6,108,041 A | * | 8/2000  | Faroudja et al.| 348/446 |
| 6,118,817 A | * | 9/2000  | Wang          | 375/240  |

* cited by examiner

Primary Examiner—Andy Rao
(74) Attorney, Agent, or Firm—O'Melveny & Myers LLP

(57) ABSTRACT

The present invention comprises a method and apparatus for detection motion in video in which frames from an incoming video stream are digitized. The pixels of each incoming digitized frame are compared to the corresponding pixels of a reference frame, and differences between incoming pixels and reference pixels are determined. If the pixel difference for a pixel exceeds an applicable pixel difference threshold, the pixel is considered to be "different". If the number of "different" pixels for a frame exceeds an applicable frame difference threshold, motion is considered to have occurred, and a motion detection signal is emitted. In one or more other embodiments, the applicable frame difference threshold is adjusted depending upon the current average motion being exhibited by the most recent frames, thereby taking into account "ambient" motion and minimizing the effects of phase lag. In one or more embodiments, different pixel difference thresholds may be assigned to different pixels or groups of pixels, thereby making certain regions of a camera's field of view more or less sensitive to motion. In one or more embodiments of the invention, a new reference frame is selected when the first frame that exhibits no motion occurs after one or more frames that exhibit motion.

23 Claims, 4 Drawing Sheets

METHOD AND APPARATUS FOR THE DETECTION OF MOTION IN VIDEO

BACKGROUND OF THE INVENTION

1. Field of the Invention

The present invention relates to a method and apparatus for detecting motion in video.

2. Background Art

There are many situations in which a motion detector is used to trigger an event when motion is detected or not detected. Some applications involve turning on lights when someone enters a room, or turning off lights when there is no movement in a room. Other uses include security, car theft protection, alarms, automatic doors, and others. Current motion detection systems have a number of disadvantages, including cost, complexity, poor performance, and others.

In the prior art there are two approaches to motion detection: "active" and "passive." Active techniques emit some form of energy (e.g. sound or electromagnetic radiation) and detect motion based on the returned signals. These techniques tend to require more power, to be more disruptive of the environment, and to be easy to detect and defeat. Passive techniques do not emit signals but instead passively observe the environment being monitored and react to observed motion. Video cameras are used in some passive motion detection techniques.

A number of techniques have been developed to detect motion within the field of view of a video camera. These techniques include analog and digital techniques. Analog techniques typically look at the analog video signal generated by a camera and detect motion by examining changes in the signal. Examples of simple prior art analog techniques include putting photocells on a television monitor and detecting changes in values, using one-shot timers to sample fixed locations in a video signal, and using various circuits to integrate the video signal. These simple techniques generate signals that can be compared against baseline values to detect changes in the video signal that presumably are caused by motion. Other prior art analog techniques filter or integrate the incoming video signal and look for gross changes in the signal's characteristics to detect motion.

These analog approaches tend to be inexpensive, but provide poor results because they utilize adulterated and simplified versions of the video signal. The bulk of the information content of the signal is discarded. Working with a signal with so little information content, the best that can be achieved is a presumption that motion has occurred in the scene when the incoming signal changes in a particular way.

All of these prior art analog techniques tend to be imprecise in what they measure. Accordingly, they have inherent limitations as to their sensitivity to actual motion. They are also susceptible to false triggers.

Digital techniques tend to be better at reducing both false positive (detecting motion when there is none) and false negative (not detection motion when motion does exist) motion detection outputs. Digital approaches are able to accurately and repeatably associate a numerical value with a physical portion of the video camera's field of view. This ability to accurately quantify the light coming from an area in space makes it possible to determine when motion occurs in the scene being observed more accurately than can be done using analog techniques.

Prior Art Digital Techniques

Digital motion detection techniques are used for two general types of applications—determining inter-video-frame motion so that signal processing can be applied to deal with video interlacing issues, and video-based monitoring for physical security purposes. Techniques developed for video interlace signal processing tend to be much more computationally intensive, and therefore costly, than techniques developed for video security monitoring. In addition, video interlace processing techniques are not suited for detecting small amounts of motion and therefore do not work well in security video applications. Because these two application areas have quite different requirements, the digital processing techniques developed for each are different in nature. For example, in the case of motion detection for the purpose of video monitoring of an area, the ability to successfully detect motion is the key objective. Exact information on which particular objects in the field of view have moved and by how much is of lesser significance. For video interlace processing, however, it is important to know which object has moved and by how much. An example of a video motion detection technique designed for: video interlace processing is disclosed in U.S. Pat. No. 4,851,904 issued to Miyazaki, et. al.

Image understanding techniques have been developed for use in video interlace processing. These image understanding techniques automatically segment a video image into regions of pixels that correspond to objects in a video camera's field of view. The motion of these objects can then be detected and tracked. These techniques are computationally intensive and expensive. They can rarely be made to run in real-time. Accordingly, they typically cannot be used for digital video security applications.

One example of a prior art computationally intensive approach for detecting motion involves taking regions of pixels (typically an N×M rectangle) from an incoming video stream and correlating them with corresponding regions of pixels in a reference image. This approach can be thought of as an approximation of the generalized image understanding approach described above. The incoming image is divided up into rectangles. These rectangles are compared against corresponding rectangles of a reference image. Dividing an image into rectangles in this manner and comparing rectangles is considerably simpler than trying to identify individual objects in an incoming image and attempting to compare the location of those objects with the location of corresponding objects in the reference image. This technique is used as part of the MPEG video compression standard and is known as "motion-compensation." While this approach can be effective in detecting motion and is less complex than some other image understanding techniques, it is still time consuming and typically requires the use of large and expensive custom integrated circuits. In addition, it tends to be sensitive the to the quality of the incoming image. Any noise in the incoming video signal makes it very difficult to locate corresponding regions in a reference image.

Other digital techniques for motion detection in security video applications are based on the detection of edges in video images—i.e., abrupt transitions in color or brightness that delineate one region from another. Edge detection simplifies the processing of images by requiring the detection and storage of transitions only, as opposed to processing and storing values for large numbers of pixels. Edge detection takes advantage of the fact that there is a high degree of correlation between pixels in a video image (i.e., large regions of pixels tend to share similar values).

Devices that use edge detection tend to be very sensitive to false trigger events caused by changes in lighting. A stationary scene may appear to move as the lighting changes the location of shadows in a scene over the course of a day. An example of an edge detection system is disclosed in U.S. Pat. No. 4,894,716 issued to Aschwanden et al. The system disclosed by Aschwanden et al. looks for changes in the location of edges from frame to frame. This system requires a certain degree of vertical coherence to cause a trigger—i.e., there must be a given amount of phase shift of an edge across multiple lines for motion to be detected. The reference data that is stored comprises a set of counts indicating where edges exist in the vertical scan lines of the previous frame.

Edges are detected by low-pass filtering a scan line of the incoming video, thresholding the signal, then using the filtered and thresholded signal to trigger a one-shot. The one-shot in turn is used to gate a counter whose final value is the location of an edge in the scan line.

While this edge detection technique provides a simple method for motion-detection, it is constrained with respect to the region of the video signal over which it works, and it uses only the previous frame as a reference. As a result, sufficiently slow-moving objects are not detected. Also, this approach does not work well in an environment that does not lend itself well to edge-detection—e.g., where there is insufficient contrast to find edges, or where there are sufficiently large amounts of high frequency components in the scene that create too many edges.

Another motion detection scheme using edge detection is described in U.S. Pat. No. 5,272,527 issued to Watanabe. In the system described by Watanabe, a classical signal processing technique is applied to extract edges from an input image, noise reduction techniques are applied, and an averaging mechanism is used to binary threshold the incoming image data. The previous two binary images are retained and a series of logical operations are performed on these images to create a reference against which an incoming binary image is compared. In essence, the previous two frames are used to generate a reference mask (by inverting their union), and then a population count of binary ones is applied to the masked version of the incoming image. The result is an estimate the difference between the incoming image and the previous two images. The approach of Watanabe is extremely complex and costly, and of questionable effectiveness.

The majority of video motion detection techniques work on the principle of comparing an incoming video signal to a stored reference signal. Some devices are constrained to only use the previous frame as a reference. While using only the previous frame as a reference has the benefit of requiring less storage, is less sensitive to false trigger events due to slowly changing lighting, and lends itself to a more simple implementation, it has the drawback of being unable to detect slow rate of change events.

In the digital domain, a common method for detecting motion is to subtract the value of each pixel of an incoming frame from the corresponding pixel in the reference frame, accumulate the resulting difference, and generate a motion indication when the accumulated difference signal exceeds some predetermined amount. A problem with this approach is that changes over the whole image field can cancel each other out, thereby giving a false reading. For example, a given pixel could be brighter than its corresponding reference pixel by amount N, and another pixel could be darker than its reference pixel by -N. In such a circumstance, the changes cancel out and significant motion may not be detected.

In addition, the simple differencing of values of corresponding pixels does not provide effective motion detection.

Further, the outputs of video cameras typically have some noise imposed upon the video signal. As a result, the value reported for a pixel in an unchanging scene may vary plus and minus some amount from frame to frame simply due to noise. Most existing motion detection methods do not compensate for this noise. Consequently noise on the video signal contributes to false positive responses, requiring motion detectors to be desensitized to the point that additional false negatives are generated.

An example of a motion detection system that suffers from some of these problems is disclosed in U.S. Pat. No. 5,455,561 issued to Brown. In the system disclosed by Brown, a hybrid analog/digital approach is used in which the incoming frame is added to an inverted version of a stored reference frame. The resulting difference value is thresholded and the motion indication is generated when the thresholded value exceeds a preset amount for a given number of clock cycles. The Brown system chooses new reference frames periodically at predetermined increments of time, regardless of the current level of activity being observed by the camera. In the system of Brown, the threshold value being used is a constant (i.e., does not vary according to the input values), and the number of different pixels which are considered to constitute significant motion is also a constant.

Another approach to motion detection involves the digital decimation (by sub-sampling and low pass filtering) of video images in order to get a reduced data set. The reduced data set is compared to a similarly reduced reference image. Because decimation involves low-pass filtering of the original data, pixels of the resulting decimated image contain contributions from other pixels in the original image that were not selected during sub-sampling. Decimation can reduce the number of pixels that need to be compared while still allowing motion within the field of view to be detected. An example of a decimation approach is described in U.S. patent application Ser. No. 08/655,562 filed May 30, 1996, assigned to assignee of the present invention.

Some existing motion detection devices allow a region of interest within the field of view of the camera to be specified. For example, a border around an active image area of the video camera can be defined to be excluded from the motion detection mechanism. Likewise, entire regions within the camera's field of view can be masked out so that motion within (or, alternatively, outside) these regions is ignored. The behavior of these masking schemes has heretofore been strictly binary—a pixel is either included in the motion calculation, or not.

U.S. Pat. No. 5,339,104 issued to Hong describes a system that uses a windowing mechanism to restrict the area of interest to a rectangle within the full video frame. The system of Hong digitizes and stores a reference frame and compares it against the incoming video. A per-pixel comparison function is carried out by a table lookup in an EPROM. The (six bit) input pixel values and the reference pixel values are concatenated and presented to the EPROM as an address. The resulting output of the EPROM is the difference value. The difference value is compared with base and limit values provided by the controlling microprocessor and a binary output is generated to indicate whether the difference is within the given range of values. A count of the number of differences that fall within the given range is maintained and a motion indication is generated when the count exceeds a given value.

SUMMARY OF THE INVENTION

The present invention comprises a method and apparatus for detecting motion in video in which frames from an incoming video stream are digitized. The pixels of each incoming digitized frame are compared to the corresponding pixels of a reference frame, and differences between incoming pixels and reference pixels are determined. One or more embodiments of the invention use both a pixel difference threshold (that defines the degree (in absolute value) to which a pixel must vary from it's corresponding reference pixel in order to be considered different) and a frame difference threshold (that defines the number of pixels which must be different for a motion detection indication to be given). If the pixel difference for a pixel exceeds the applicable pixel difference threshold, the pixel is considered to be "different". If the number of "different" pixels for a frame exceeds the applicable frame difference threshold, motion is considered to have occurred, and a motion detection signal is emitted. A simple thresholding mechanism may be used. For example, in one embodiment, motion is declared to have occurred if more than N of the M pixels in the incoming frame are different from the reference frame. In one or more other embodiments, the applicable frame difference threshold is adjusted depending upon the current average motion being exhibited by the most recent frames, thereby taking into account "ambient" motion and minimizing the effects of phase lag.

In one or more embodiments, different pixel difference thresholds may be assigned to different pixels or groups of pixels, thereby making certain regions of a camera's field of view more or less sensitive to motion. In one or more embodiments of the invention, a new reference frame is selected when the first frame that exhibits no motion occurs after one or more frames that exhibit motion.

The present invention provides an efficient and reliable motion detection system.

DETAILED DESCRIPTION OF THE INVENTION

Figure 1:
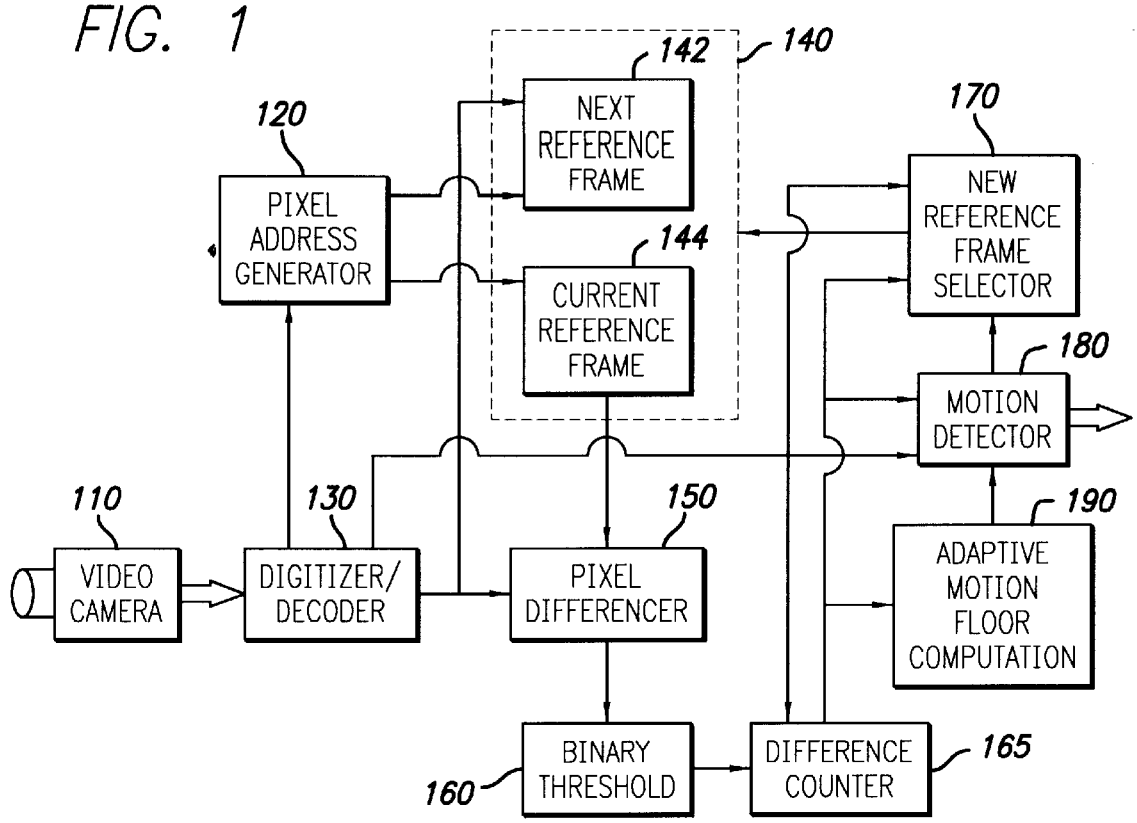
FIG. 1 is a schematic diagram of an embodiment of the invention.

A method and apparatus for detecting motion in video is described. In the following description, numerous specific details are set forth to provide a thorough description of the invention. It will be apparent, however, to one skilled in the art that the invention may be practiced without these specific details. In other instances, well-known features have not been described in detail so as not to obscure the invention.

The present invention provides an effective means of reliably detecting actual motion in a video signal with a simple and low-cost circuit. One embodiment of the invention works by digitizing and decoding the signal from a video camera. Using a digital technique, each pixel location in an image is accurately and repeatably measured and a "value" is assigned to each pixel. For example, for a YUV color scheme, two color component values and one luminance ("luma") value are assigned to each pixel. For other color schemes, other values may be used. The term "value" as used herein in regard to a pixel refers to any one or more of the values that are assigned to the pixel during the digitizing process, or that are derived from the assigned values.

As each pixel is digitized it is compared to a corresponding pixel in a reference frame. A determination is made as to how different these two pixels are. In the ideal case, if a scene is not changing, the value of a pixel at the same location within a frame of video should have the same value across successive frames. However, in practice the sensors in video cameras are subject to noise, so that even when a scene does not change, the value of a pixel at any given location in the video frame will vary somewhat from frame to frame.

The invention takes advantage of the observation that the degree of variation in pixel value that occurs from frame to frame due to noise tends to be fairly well-defined and consistent (at least for a given video camera) and uses a thresholding mechanism to eliminate the effects of noise. In one embodiment, this thresholding is accomplished by taking the absolute value of the difference between an incoming pixel and its reference pixel, and comparing that absolute value with a given threshold value. If the absolute value of the difference is less than the threshold value, the variance in pixel values is attributed to noise, and the incoming pixel is considered essentially unchanged from the reference pixel.

By taking the absolute value of the pixel differences, the invention does not consider the manner in which an incoming pixel differs from its reference pixel (e.g. whether the incoming pixel is brighter or darker than its reference pixel). Instead, it focuses on the magnitude of the difference, not the direction of the difference.

One embodiment determines whether motion exists in a frame by counting the number of pixels that have significant differences between the incoming frame and the reference frame. For each input video frame, a count of pixels that are considered to be significantly different from their reference pixels is maintained. This per-frame pixel difference count is used to determine whether motion has occurred between the incoming and reference frames.

Unlike the prior art, the present invention has the ability to detect the current "ambient" level of motion and desensitize the motion detector in proportion to the amount of motion that is currently being observed. This is done in a manner that allows the average motion over a recently passed interval of time to be calculated without having to maintain a long history of recent perframe cumulative pixel difference counts, and doing a sliding window average over these values. A technique known as trailing exponential averaging is used to generate the average number of pixels that are changing from frame to frame. The current frame's pixel difference count is added to the average pixel difference count and the resulting sum is divided by two (which can be easily accomplished by shifting the binary value of the sum to the right by one place in a fixed length shift register, for example). The result is an average in which previous frames' values contribute successively less to the current average. This technique provides a good approximation to a sliding window average, at a much lower cost, with a simpler implementation.

Figure 3:
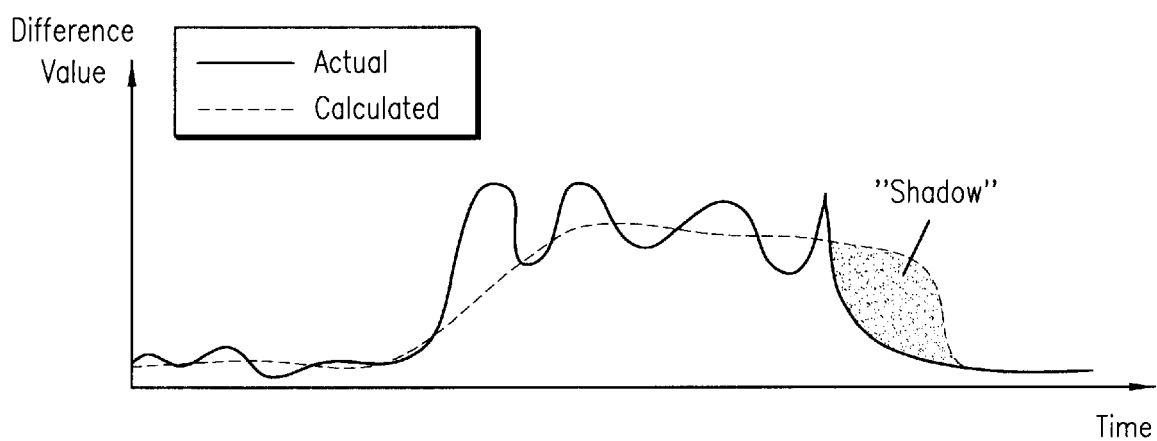
FIG. 3 is an illustration of phase lag.

Average calculations are effectively low-pass filters, which tend to suffer from a problem known as phase lag: the computed average value lags behind the actual value. One potential effect of this phase lag is a reaction time "shadow" (illustrated in FIG. 3) that may occur when there is sudden drop off in actual activity. In this circumstance, the calculated average value of the pixel difference count remains much higher, for a period of time, than the actual pixel difference count, leaving the system excessively insensitive to changes in motion producing pixel difference counts below the calculated average. This phase lag could allow the motion sensor to fail to detect significant motion following a sustained period of higher motion.

The present invention deals with this potential problem by responding in an asymmetric manner to changes in the amount of motion being observed. In one embodiment, when the current difference count for a frame is significantly less than the current average, the current value is weighted more in calculating the average. This has the effect of bringing the average value down more quickly to the actual value, thereby reducing the sensitivity "shadow." The invention is thus able to dynamically adapt to a variety of different conditions and circumstances.

In a video motion detection system it is important that changes in lighting are not confused with motion. The ability of the system to distinguish significant motion from other artifacts depends greatly on the policy used to choose reference frames. A common approach is to always use the previously received frame as the reference frame. Doing so has the effect of making the device unable to detect very slow moving objects.

In one or more embodiments of the invention, instead of using the previous frame as a reference frame, a new reference frame is periodically selected based on specified reference frame selection criteria. In this way, the motion effects of slow moving objects accumulate as the incoming pixels gradually diverge from their reference pixels, eventually causing a motion event to be triggered. In one embodiment, the reference frame that is chosen is the last frame of video that exhibited the last motion that was detected. Other policies for choosing reference frames can also be used.

False motion information may also be introduced into a video signal by the phase alternation of chrominance information in standard video coding formats. This phase alternation is useful in the analog domain, but introduces an artificial shift in the value of a given pixel location from frame to frame. One or more embodiments of the invention take the effects of phase alternation into account to ensure that it does not create the appearance of false motion. In these embodiments, comparisons are only done against incoming frames that belong to the same phase group as the reference field.

In one or more embodiments of the invention, different threshold values can be applied to each pixel position or to groups of pixel positions. Doing so has the effect of allowing each pixel or group of pixels to be made more or less sensitive to variations. In one embodiment, an image editing interface is used to specify the regions that should be more or less sensitive to changes in pixel values. Corresponding values are loaded into an array of pixel threshold weights. These weights define the degree of change required before a given pixel is deemed to have changed. Using pixel weights, the motion detection system can be made to pay less attention to some areas and more attention to other areas in the video camera's field of view. For example, if there is an area that contains a continuously moving object (e.g., a clock or a fan), the sensitivity in this area can be attenuated. Similarly, some areas (e.g., a consistently light door or a desk top) can be defined to have a hyper-sensitivity to change.

In one or more embodiments, the motion detection system of the invention emits a binary value that indicates that motion has been detected. This motion detection output can be used to turn on or off an alarm, switch on or off a video tape recorder, send an electronic message, or enable or disable some other switch, device or actuator.

The invention can be used with color or monochrome cameras. With color video input, the motion detection system of the invention can operate on any one or more of the values assigned to the pixel depending on the color scheme being used. For example, the motion detection system can operate on the full color value of each pixel, or it can operate only on the luminance portion of the video signal. By operating only on the luminance value of each video pixel, the cost and complexity of a system implementing the invention can be reduced compared to a system that performs full color processing. Processing only the luminance information is an effective optimization because doing so does not diminish the effectiveness of the motion detection system.

FIG. 1 is a schematic diagram of an embodiment of the invention. The components shown in FIG. 1 may be implemented in hardware, software, and/or a combination thereof.

In the embodiment of FIG. 1, video camera 110 provides an analog video stream that is digitized and decoded by digitizer/decoder 130. In addition to digitizing incoming video frames, digitizer/decoder 130 also generates a set of synchronization signals that indicate times at which pixels, rows of pixels (i.e., video scan lines), and arrays of pixels (i.e., video frames/fields) are available to other components of the system.

The digitized video data (consisting of pixels of the current incoming video frame) is simultaneously sent to the pixel differencer 150 and the frame store 140. Pixel differencer 150 subtracts the current pixel's value from that of the corresponding pixel in the current reference frame 144, and sends the absolute value of the result to binary thresholding unit 160. Binary thresholding unit 160 compares the absolute value of the difference between the incoming pixel and the reference pixel against a threshold value and emits a binary value that indicates whether or not the difference is significant. This binary value is sent to the difference counter 165, which keeps a count of the number of pixels for each frame that are significantly different from the corresponding pixels in the current reference frame.

When the final pixel of an incoming video frame has arrived, digitizer/decoder 130 generates a synchronization signal that indicates an end of frame condition. Upon receiving the end of frame signal, motion detector 180 analyses the current frame to determine whether motion has occurred. Motion detector 180 looks at the incoming frame's difference count (from difference counter 165), and the current motion floor value (from adaptive motion floor computation unit 90), and determines whether the most recent frame has significant motion (with respect to the reference frame). If the value of the frame's difference count is above the current motion floor value by an amount greater than a given threshold value, a motion indication signal is generated by motion detector 180. The motion indication signal is generated until no motion is detected for a subsequent frame.

Following completion of the motion detection function for a video frame, difference counter 165 is reset to zero, adaptive motion floor compensation unit 190 updates its value, and new reference frame selector 170 indicates whether the current reference frame 144 should be replaced with the next reference frame 142. In one embodiment, new reference frame selector 170 selects a new frame whenever a frame for which motion has been detected is followed by a frame for which no motion is detected. The frame for which no motion has been detected is then selected as the new reference frame.

Adaptive motion floor computation unit 190 maintains a record of the difference counts for a number of frames preceding the current frame and determines an effective measure of the average current amount of motion in the video sequence. This current average amount of motion value provides motion detector 180 with a measure of how much activity is the current "norm." Knowing the current average amount of motion allows the invention to adapt to varying long-term motion conditions—i.e., become less sensitive to motion when there has been a lot of motion for a period of time, and become more sensitive when there has been little motion.

Pixels of an incoming frame are stored in next reference frame portion 142 of frame store 140. Generation of the appropriate pixel address in which to store pixels in frame store 140 is done by pixel address generation logic 120, which sequences pixel addresses in step with the incoming pixel's clock signal generated by the digitizer 130. If new reference frame selector 170 indicates that the next and current reference frames should be exchanged, then the current frame stored in next reference frame 142 is transferred to current reference frame 140. If new reference frame selector 170 does not indicate that the next and current reference frames should be exchanged, then the next reference frame 142 is overwritten by the next incoming frame's pixels.

Figure 2:
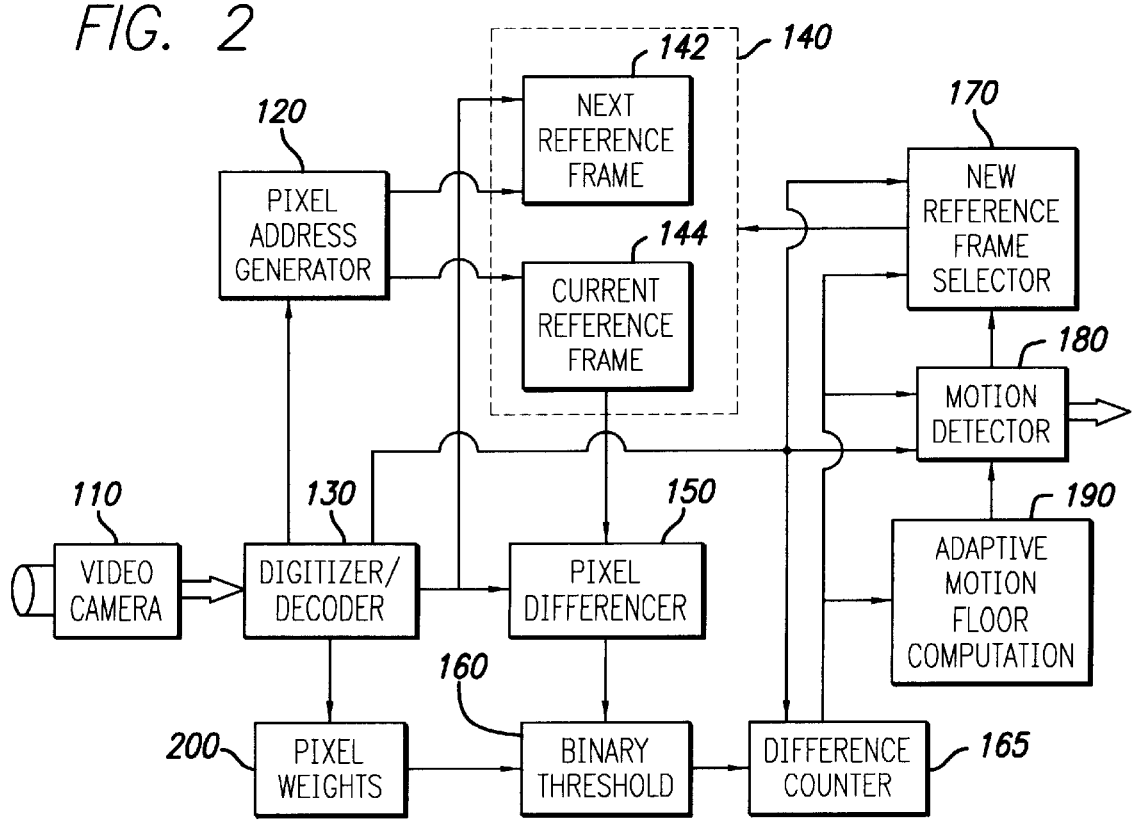
FIG. 2 is a schematic diagram of an embodiment of the invention.

FIG. 2 illustrates an embodiment of the invention that includes the ability to assign weights to particular pixels and/or groups of pixels. In the embodiment of FIG. 1, pixel differencer 150 compares the difference between incoming and reference pixels against a constant threshold value. In the embodiment of FIG. 2, each pixel location may be assigned a different threshold. Each incoming pixel is deemed different from its corresponding reference pixel only if the difference between the incoming pixel's value and the reference pixel's value exceeds the particular threshold value for that pixel. In the embodiment of FIG. 2, binary threshold unit 160 thus receives two values for each pixel—the absolute value of the difference between the value of the incoming pixel and the value of its corresponding reference pixel, and the threshold value applicable to that pixel from pixel weight unit 200. Binary threshold unit 160 emits a difference indication to difference counter 165 only when the difference provided by pixel differencer unit 150 exceeds the threshold value provided by the pixel weights unit 200.

Figure 4:
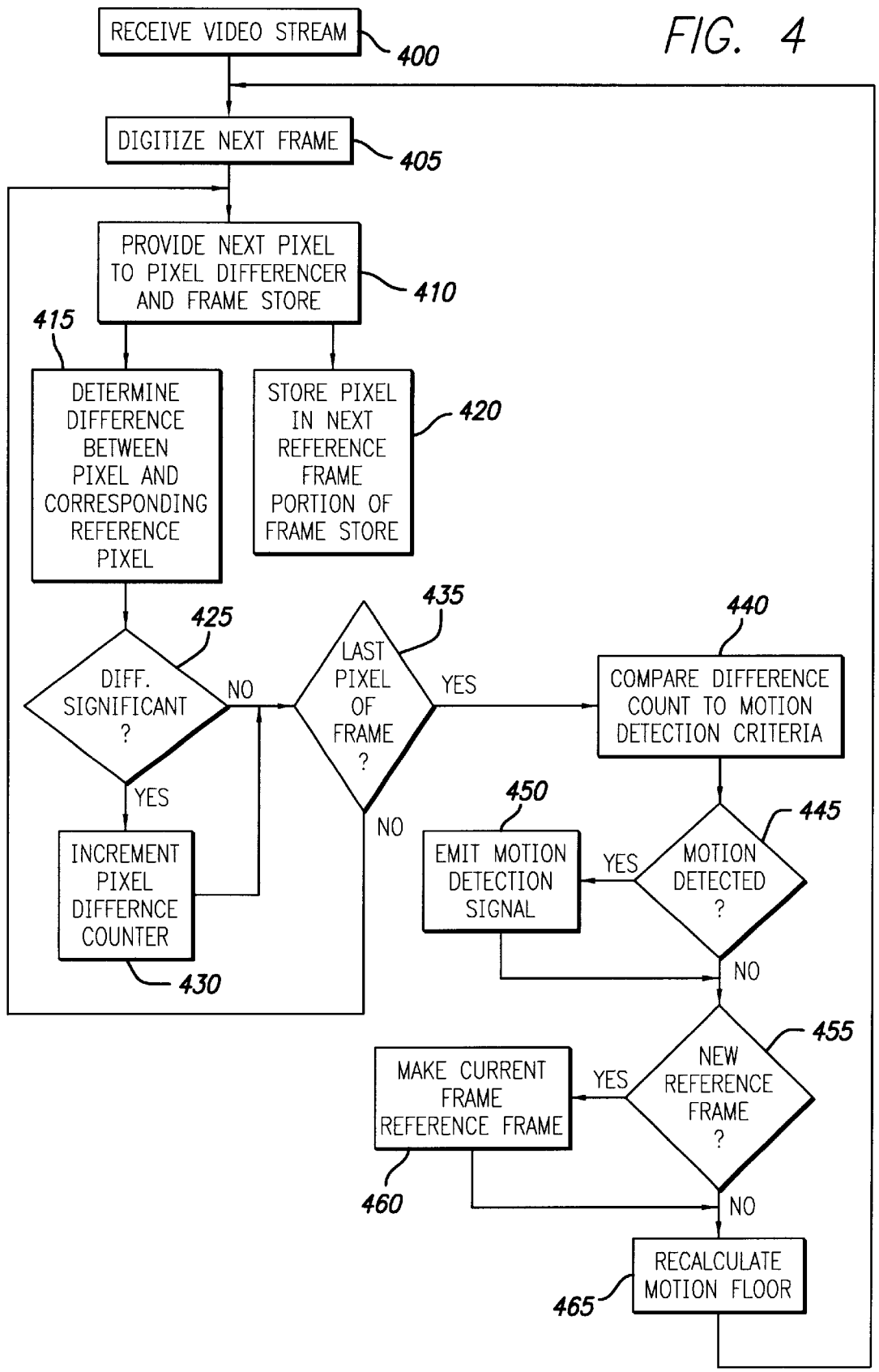
FIG. 4 is a flow chart showing a process used in an embodiment of the invention.

FIG. 4 is a block diagram of a process used in one or more embodiments of the invention.

As shown in FIG. 4, a video stream is received at step 400. The video stream may be received, for example, from a video camera. At step 405, the next frame of the video stream is digitized. At step 410, the next pixel of the digitized video frame is provided to a pixel differencer and to a frame store. At step 415, the difference in value of the pixel and the value of its corresponding pixel in the reference frame is determined. At the same time, at step 420, the pixel is stored in an appropriate location in a "next reference frame" portion of the frame store.

After the pixel difference is determined at step 415, a determination is made at step 425 as to whether the pixel difference is significant. The methods described with respect to the embodiments of FIGS. 1 and 2, or other appropriate methods, may be used to determine whether the pixel difference is significant. If it is determined that the pixel difference is significant, a pixel difference counter that counts the number of significantly different pixels of the current frame is incremented at step 430, and the process proceeds to step 435. If it is determined that the pixel difference is not significant, the process proceeds directly to step 435.

At step 435 a determination is made as to whether the current pixel is the last pixel of the current frame. Such a determination may be made, for example, based on an end of frame signal generated by,digitizer/decoder 130 of the embodiments of FIGS. 1 and 2. If it is determined that the current pixel is not the last pixel of the current frame, processing returns to step 410, and the next pixel is provided to the pixel differencer and frame store. If it is determined that the current pixel is the last pixel, processing proceeds to step 440.

At step 440 the difference count for the current frame generated by the pixel difference counter is compared to the motion detection criteria used by the system to determine whether motion has occurred. Any of the previously described motion detection criteria, as well as other criteria, may be used.

At step 445 a determination is made as to whether motion has been detected according to the motion detection criteria. If motion has been detected, a motion detection signal is emitted at step 450, and processing proceeds to step 455. If no motion has been detected, processing proceeds directly to step 455.

At step 455 a determination is made as to whether a new reference frame is to be selected. For example, the previously described method of selecting a new reference frame upon the occurrence of the first frame for which no motion has been detected after a frame for which motion has been detected may be used. If it is determined that a new reference frame is to be selected, the current frame in the new reference frame portion of the frame store is selected as the new reference frame, and processing proceeds to step 465. If it is determined that a new reference frame is not to be selected, processing proceeds directly to step 465.

At step 465, the motion floor value is recalculated based on the amount of motion exhibited by the current frame. At step 470, the pixel difference counter is zeroed, and processing returns to step 405, where the next frame of the video stream is digitized.

Figure 5:
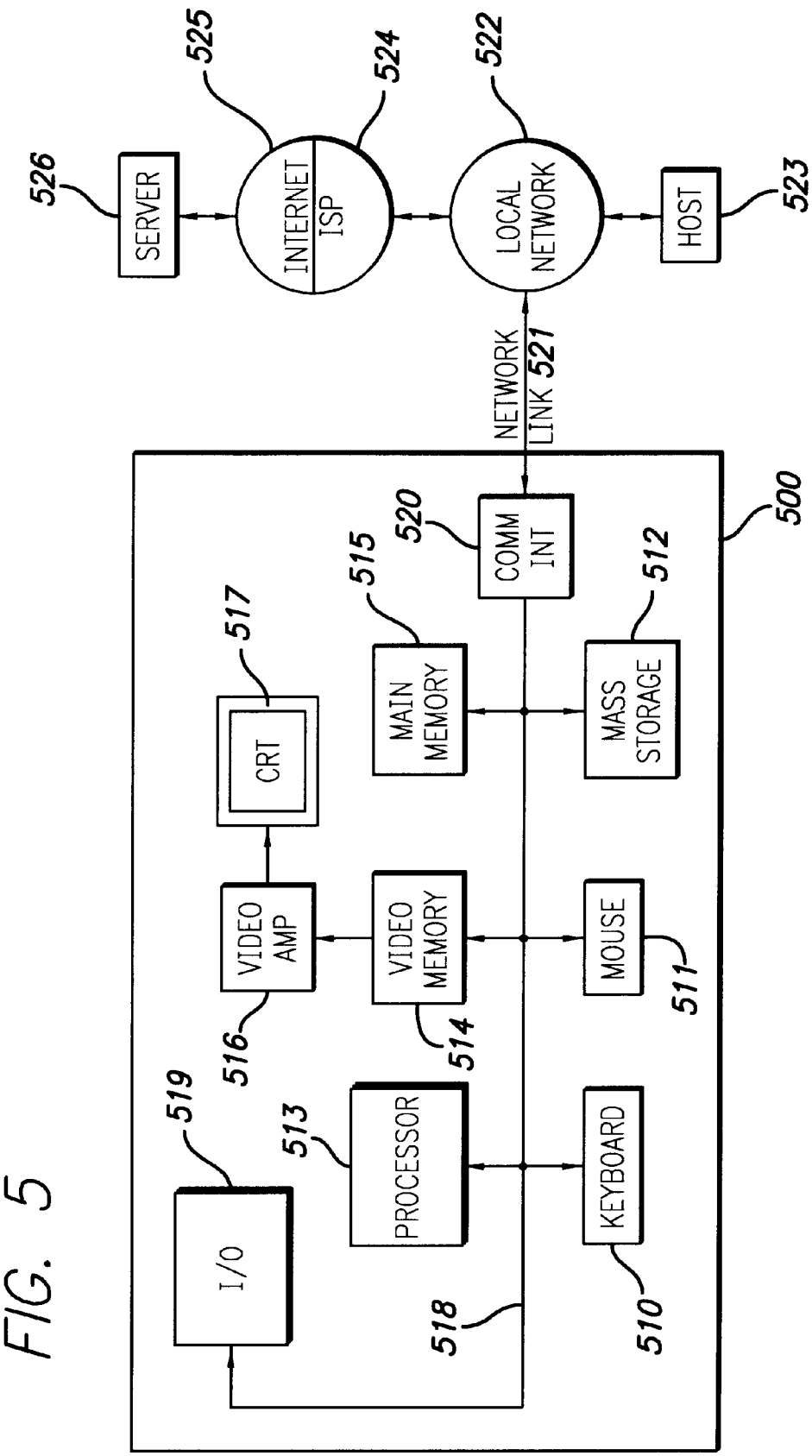
FIG. 5 is a schematic diagram of a computer system that can be used to implement the invention.

All or part of one or more embodiments of the invention can be implemented as computer software in the form of computer readable code executed on a general purpose computer such as computer 500 illustrated in FIG. 5, or in the form of bytecode class files executable within a Java™ runtime environment running on such a computer. A keyboard 510 and mouse 511 are coupled to a bidirectional system bus 518. The keyboard and mouse are for introducing user input to the computer system and communicating that user input to processor 513. Other suitable input devices may be used in addition to, or in place of, mouse 511 and keyboard 510. I/O (input/output) unit 519 coupled to bidirectional system bus 518 represents such I/O elements as a printer, A/V (audio/video) I/O, a video capture and digitizer board, etc.

Computer 500 includes a video memory 514, main memory 515 and mass storage 512, all coupled to bidirectional system bus 518 along with keyboard 510, mouse 511 and processor 513. Mass storage 512 may include both fixed and removable media, such as magnetic, optical or magnetic optical storage systems or any other available mass storage technology. Bus 518 may contain, for example, thirty-two address lines for addressing video memory 514 or main memory 515. The system bus 518 also includes, for example, a 32-bit data bus for transferring data between and among the components, such as processor 513, main memory 515, video memory 514 and mass storage 512. Alternatively, multiplex data/address lines may be used instead of separate data and address lines.

In one embodiment of the invention, the processor 513 is a microprocessor manufactured by Motorola, such as the 680X0 processor or a microprocessor manufactured by Intel, such as the 80X86, or Pentium processor, or a SPARC™ microprocessor from Sun Microsystems™, Inc. However, any other suitable microprocessor or microcomputer may be utilized. Main memory 515 is comprised of dynamic random access memory (DRAM). Video memory 514 is a dual-ported video random access memory. One port of the video memory 514 is coupled to video amplifier 516. Video amplifier 516 is used to drive the cathode ray tube (CRT) raster monitor 517. Video amplifier 516 is well known in the art and may be implemented by any suitable apparatus. This circuitry converts pixel data stored in video memory 514, which may, for example, include pixel data representing one or more embodiments of the sliders and data fields of the invention, to a raster signal suitable for use by monitor 517. Monitor 517 is a type of monitor suitable for displaying graphic images.

Computer 500 may also include a communication interface 520 coupled to bus 518. Communication interface 520 provides a two-way data communication coupling via a network link 521 to a local network 522. For example, if communication interface 520 is an integrated services digital network (ISDN) card or a modem, communication interface 520 provides a data communication connection to the corresponding type of telephone line, which comprises part of network link 521. If communication interface 520 is a local area network (LAN) card, communication interface 520 provides a data communication connection via network link 521 to a compatible LAN. Wireless links are also possible. In any such implementation, communication interface 520 sends and receives electrical, electromagnetic or optical signals which carry digital data streams representing various types of information.

Network link 521 typically provides data communication through one or more networks to other data devices. For example, network link 521 may provide a connection through local network 522 to local server computer 523 or to data equipment operated by an Internet Service Provider (ISP) 524. ISP 524 in turn provides data communication services through the world wide packet data communication network now commonly referred to as the "Internet" 525. Local network 522 and Internet 525 both use electrical, electromagnetic or optical signals which carry digital data streams. The signals through the various networks and the signals on network link 521 and through communication interface 520, which carry the digital data to and from computer 500, are exemplary forms of carrier waves transporting the information.

Computer 500 can send messages and receive data, including program code, through the network(s), network link 521, and communication interface 520. In the Internet example, remote server computer 526 might transmit a requested code for an application program through Internet 525, ISP 524, local network 522 and communication interface 520. In accord with the invention, one such downloaded application is an application that implements the method of selecting data described herein.

The received code may be executed by processor 513 as it is received, and/or stored in mass storage 512, or other non-volatile storage for later execution. In this manner, computer 500 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment, including appliances and electronic devices using embedded processors and controllers and LCD displays.

Thus, a method and apparatus for detecting motion in video has been presented. Although the present invention has been described with respect to certain example embodiments, it will be apparent to those skilled in the art that the present invention is not limited to these specific embodiments. For example, even though the invention has been described as operating on pixels of an image frame, the invention may operate on other image elements, such as, for example, groups of pixels. Further, although the operation of certain embodiments has been described in detail using certain detailed process steps, some of the steps may be omitted or other similar steps may be substituted without departing from the scope of the invention. Other embodiments incorporating the inventive features of the present invention will be apparent to those skilled in the art. The invention is defined by the claims and their full scope of equivalents.

What is claimed is:

1. A method for detecting motion in video comprising the steps of:

digitizing an incoming video signal to produce digitized incoming video frames comprising image elements;

obtaining a difference value for each of said image elements of a first incoming video frame by comparing a value of said image element of said first incoming video frame to a value of a corresponding image element of a reference frame;

comparing said difference value to a difference value threshold for said image element;

maintaining a count of each image element whose difference value exceeds said difference value threshold for said image element; and generating a motion detection indication when said count of image elements exceeds a first difference count threshold applicable to said first incoming video frame.

2. The method of claim 1 wherein said step of obtaining a difference value comprises obtaining a difference value that is a non-negative number.

3. The method of claim 1 further comprising:

repeating said obtaining, comparing, and maintaining step for a second incoming video frame; and selecting said second incoming video frame as a reference frame when said count of image elements for said first incoming video frame exceeds said first difference count threshold and said count of image elements for said second incoming video frame is less than a second difference count threshold applicable to said second incoming video frame.

4. The method of claim 1 wherein said image elements comprise groups of pixels.

5. The method of claim 1 wherein the same difference value threshold is applicable to a plurality of adjacent image elements of said first incoming video frame.

6. The method of claim 3 further comprising the step of deriving said second difference count threshold from said first difference count threshold.

7. A motion detection system comprising:
   a video input device for obtaining a video input;
   a digitizer for receiving said video input and for producing digitized video input frames comprising image elements;
   a differencer for obtaining difference values between image elements of said input frames and corresponding image elements of corresponding reference frames;
   a thresholder for determining for each of said difference values whether said difference value exceeds a corresponding difference threshold;
   a difference counter for counting the number of said image elements for which said difference value exceeds said corresponding difference threshold; and
   a motion detector for emitting a motion detection indicator when said number of said image elements exceeds a corresponding difference count threshold.

8. The motion detection system of claim 7 wherein said video input device comprises a video camera.

9. The motion detection system of claim 7 wherein said difference values comprise luminance different values.

10. The motion detection system of claim 7 further comprising a difference count threshold generator.

11. The motion detection system of claim 7 further comprising an adaptive difference count threshold generator.

12. The motion detection system of claim 7 further comprising an image element selector for selecting image elements and for assigning a difference threshold to said selected elements.

13. A computer program product comprising:
    a computer processor usable medium having computer processor readable program code embodied therein for detecting motion in video, said computer processor readable program code comprising:
        computer processor readable program code configured to cause a computer processor to digitize an incoming video signal to produce digitized incoming video frames comprising image elements;
        computer processor readable program code configured to cause a computer processor to obtain a difference value for each of said image elements of a first incoming video frame by comparing a value of said image element of said first incoming video frame to a value of a corresponding image element of a reference frame;
        computer processor readable program code configured to cause a computer processor to compare said difference value to a difference value threshold for said image element;
        computer processor readable program code configured to cause a computer processor to maintain a count of each image element whose difference value exceeds said difference value threshold for said image element; and
        computer processor readable program code configured to cause a computer processor to generate a motion detection indication when said count of image elements exceeds a first difference count threshold applicable to said first incoming video frame.

14. The computer program product of claim 13 wherein said computer processor readable program code configured to cause a computer processor to obtain a difference value comprises computer processor readable program code configured to cause a computer processor to obtain a difference value that is a non-negative number.

15. The computer program product of claim 13 further comprising:
    computer processor readable program code configured to cause a computer processor to obtain a second difference value for each of said image elements of a second incoming video frame by comparing a value of said image element of said second incoming video frame to a value of a corresponding image element of a reference frame;
    computer processor readable program code configured to cause a computer processor to compare said second difference value to a difference value threshold for said image element of said second frame;
    computer processor readable program code configured to cause a computer processor to maintain a second count of each image element of said second frame whose difference value exceeds said difference value threshold for said image element of said second frame; and
    computer processor readable program code configured to cause a computer processor to select said second incoming video frame as a reference frame when said count of image elements for said first incoming video frame exceeds said first difference count threshold and said second count of image elements for said second incoming video frame is less than a second difference count threshold applicable to said second incoming video frame.

16. The computer program product of claim 13 wherein said image elements comprise groups of pixels.

17. The computer program product of claim 13 wherein the same difference value threshold is applicable to a plurality of adjacent image elements of said first incoming video frame.

18. The computer program product of claim 15 further comprising computer processor readable program code configured to cause a computer processor to derive said second difference count threshold from said first. difference count threshold.

19. The method of claim 1 wherein said first difference count threshold is derived by trailing exponential averaging.

20. The method of claim 1 further comprising:
    repeating said obtaining, comparing, and maintaining step for a second incoming video frame; and
    selecting said second incoming video frame as a new reference frame only when a motion has been detected on said first incoming video frame and no motion has been detected on said second incoming video frame.

21. The method of claim 1 further comprising:
    obtaining a second difference value for each of said image elements of a second incoming video frame by comparing a value of said image element of said second incoming video frame to a value of a corresponding image element of a reference frame;
    comparing said second difference value to a difference value threshold for said image element of said second frame;

maintaining a second count of each image element of said second frame whose difference value exceeds said difference value threshold for said image element of said second frame; and deriving a second difference count threshold applicable to said second frame, wherein said deriving step further comprises:
 adding said maintained second count to said first difference count threshold; and
 dividing a value resulting from said adding step by two.

22. The method of claim 1 further comprising:
 selecting a new reference frame to replace said reference frame whenever a prior incoming video frame for which motion has been detected is followed by a subsequent incoming video frame for which no motion is detected.

23. The method of claim 22 wherein said selected reference frame is said subsequence incoming video frame.

* * * * *